July 5, 1949.  HENRI-GEORGES DOLL  2,475,354
WELL LOGGING EQUIPMENT

Original Filed June 13, 1942  2 Sheets—Sheet 1

INVENTOR.
HENRI-GEORGES DOLL
BY
Campbell, Brumbaugh & Free
HIS ATTORNEYS.

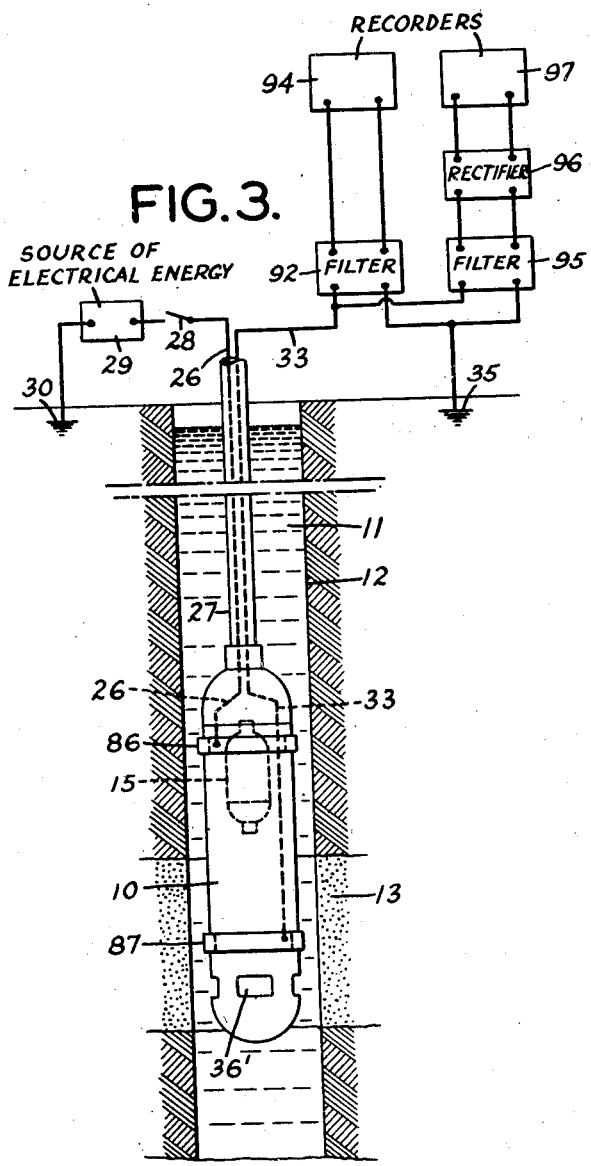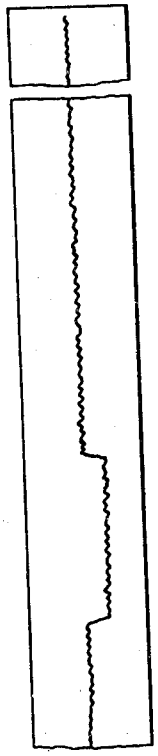

Patented July 5, 1949

2,475,354

UNITED STATES PATENT OFFICE 2,475,354

WELL LOGGING EQUIPMENT

Henri-Georges Doll, Houston, Tex., assignor to Schlumberger Well Surveying Corporation, Houston, Tex., a corporation of Delaware Original application June 13, 1942, Serial No. 446,888. Divided and this application October 8, 1947, Serial No. 778,682

5 Claims. (Cl. 175—182)

The present invention relates to methods and apparatus for investigating earth formations traversed by a bore hole, and more particularly to a new and improved method and apparatus for determining the depth and thickness of permeable formations traversed by a bore hole.

This application is a division of my copending application Serial No. 446,888, filed June 13, 1942, for Method and apparatus for investigating earth formations traversed by a bore hole, now Patent No. 2,433,746, issued December 30, 1947. The latter application discloses methods and apparatuses which utilize alternating electrofiltration potentials to locate permeable formations traversed by a bore hole containing a column of liquid. The alternating electrofiltration potentials are artificially created by producing periodically fluctuating pressure in the vicinity of a permeable formation, and they are picked up by electrodes connected to suitable indicating means. The details of the underlying theory are fully explained in the above copending application and it will not be necessary to repeat them here.

The present application is directed to a new and improved method and apparatus utilizing alternating electrofiltration potentials for locating permeable earth formations traversed by a bore hole.

The invention may be better understood from the following detailed description of several representative embodiments, taken in conjunction with the accompanying drawings in which:

Figure 3 illustrates schematically a modified form of the invention; and

Figure 4 illustrates a representative curve such as might be obtained in a bore hole with the apparatus shown in Figure 3.

Figure 1:
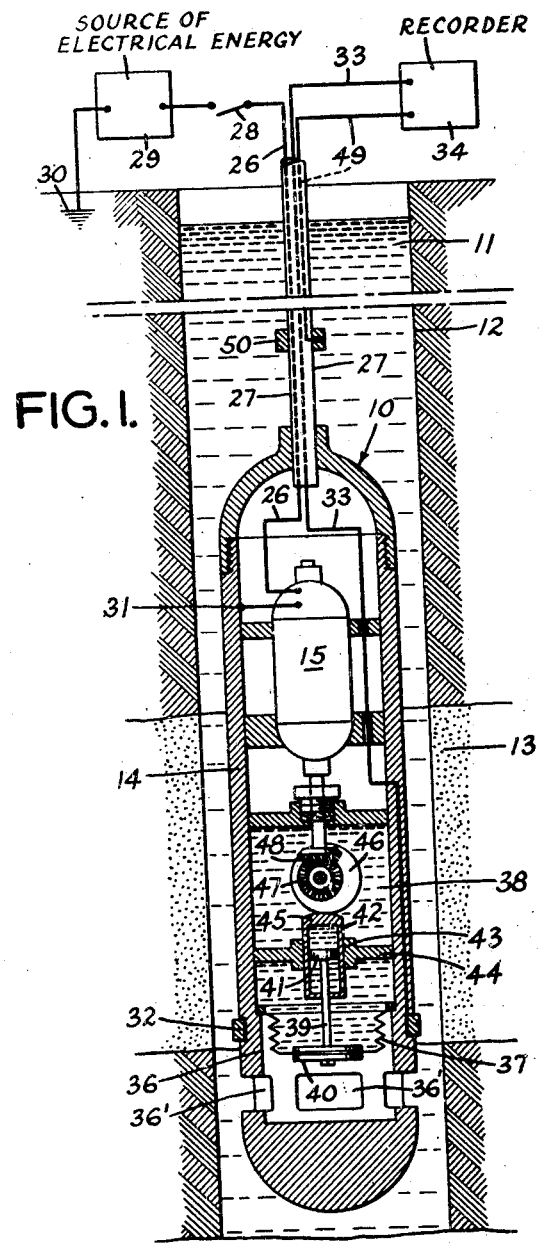
Figure 1 is a schematic diagram of typical well logging apparatus constructed according to the invention.

In the embodiment shown in Fig. 1 of the drawings, the apparatus 10 comprises a casing 14 provided with an opening 36 at the lower end thereof, in which is mounted a conventional "Sylphon" bellows 37. The "Sylphon" bellows 37 and the lower portion of the casing 14 constitute a closed chamber 38 which is preferably filled with a substantially incompressible liquid such as oil, for example, which serves to equalize the relatively great pressure of the bore hole liquid 11 contained in the bore hole 12.

The variation in pressure of the bore hole liquid 11 is produced by periodically reciprocating the "Sylphon" bellows 37 by means of a shaft 39. The lower end of the shaft 39 is secured to the lower closure member 40 of the "Sylphon" bellows 37 and its upper end is connected to the piston 41 of a conventional type dashpot 42 which is slidably mounted in a bore 43 formed in a support 44 mounted in the casing 14. The upper closure member 45 of the dashpot 42 engages a cam member 46 rotatably mounted within the casing 14 and provided with a gear 47 which is driven by a corresponding gear 48 mounted on the shaft of a motor 15. The purpose of the dashpot 42 is to permit the "Sylphon" bellows 37 to assume a position for which the pressure in the chamber 38 will be equal to the pressure of the bore hole liquid 11.

One terminal of the motor 15 is grounded as at 31 and its other terminal is connected to the conductor 26 in the supporting cable 27. The motor 15 may be energized by any suitable source of electrical energy 29 which may have one terminal grounded as at 30 and another terminal connected in series with a suitable switch 28 to the cable conductor 26.

When the switch 28 at the surface of the earth is closed, the motor 15 is energized, causing the cam 46 to rotate and periodically to reciprocate the dashpot 42. The action of the dashpot 42 is such that it does not respond to the rapid reciprocating motion produced by the cam 46. Accordingly, the reciprocatory motion produced by the cam 46 is directly transmitted to the shaft 39, so that the "Sylphon" bellows 37 is reciprocated at a rate determined by the speed of rotation of the motor 15.

As the dashpot 42 is reciprocated by the cam 46, the lower portion of the chamber below the partition 44 will successively contract and expand, thus producing pressure pulses in the liquid surrounding the bellows 37. Since the "Sylphon" bellows 37 is in communication with the bore hole liquid 11 through suitable apertures 36' formed in the lower extremity of the casing 14, its reciprocatory motion produces periodic variations in the pressure of the bore hole liquid 11 in the vicinity of the permeable formation 13. These pressure variations produce corresponding periodically variable electrofiltration potentials, as explained in the above mentioned copending application.

The periodically varying electrofiltration potentials thus produced may be measured by means of a circuit including a recorder 34 at the surface of the earth connected by the cable conductors 33 and 49, respectively, to a ring-like electrode 32 mounted on the casing 14 near the apertures 36', and to an electrode 50 mounted a relatively short distance above the electrode 32. If desired, the cable conductor 49 and the electrode 50 can be eliminated by connecting the terminal of the recorder 34 which is now connected to the cable conductor 49 to ground at the surface of the earth.

Figure 2:
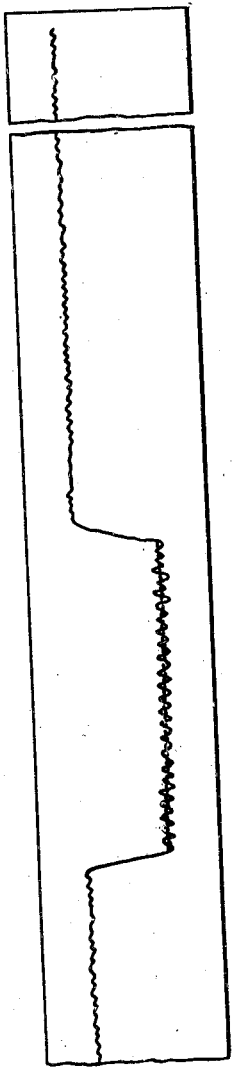
Figure 2 illustrates a representative curve such as might be obtained in a bore hole with the apparatus shown in Figure 1.

A representative curve such as might be obtained by the recording apparatus 34 in Fig. 1 is shown in Fig. 2, from which it appears that the spontaneous potential curve is modulated in the vicinity of the porous formation 13 at the frequency of vibration of the apparatus 10 in the bore hole. The normal spontaneous potential curve, such as might be obtained with the switch 28 open, is shown in dotted lines for purposes of comparison.

The apparatus illustrated in Fig. 3 of the drawings shows how alternating electrofiltration potentials may be measured simultaneously with potentials that are a function of another subject of interest in the bore hole. While any one of a number of different subjects of interest may be investigated in accordance with the invention, for the sake of convenience the invention will be described in connection with measurements of the electrical resistivity of earth formations traversed by a drill hole. Moreover, although either direct current, pulsated direct current, or an alternating current of different frequency from the alternating electrodfiltration potentials may be employed in such measurements, it will be assumed in the following description that direct current is used. Preferably, the value of the direct current employed should be high enough to render the influence of natural potentials wholly insignificant.

Considering now Fig. 3, the investigating apparatus 10 in the bore hole has mounted thereon two spaced apart, insulated electrodes 86 and 87. The electrode 86 is connected through the conductor 26 in the supporting cable 27 to a direct current source of electrical energy 29 at the surface of the earth, the other terminal of which is connected to ground at the point 30. This circuit creates in the intervening earth formations an electric field which impresses upon the electrode 87 a potential that is a function of the electrical resistivity of the formations, as described in prior United States Patent No. 1,819,923.

Variations in the continuous potential existing at the electrode 87 are transmitted through the conductor 33 in the supporting cable 27 to one terminal of a conventional type filter 92 which passes direct current but discriminates against alternating current, the other terminal of which is connected to ground at the point 35 at the surface of the earth. The output of the filter 92 is fed to a conventional type, continuous current recording instrument 94 which provides a curve that is a function of the electrical resistivity of the formations at different depths in the bore hole.

The alternating electrofiltration potentials produced by variations in the pressure of the bore hole liquid 11 created by the apparatus 10 are also picked up by the electrode 87. These potentials are transmitted through the conductor 33 to one terminal of a second filter 95 which passes alternating current of the frequency of the alternating electrofiltration potentials but discriminates against continuous current, the other terminal of which is connected to the ground at the point 35. The output of the filter 95 is preferably first rectified by means of a conventional rectifier 96, the continuous current output of which is impressed upon a conventional type recording instrument 97 which provides a curve (Fig. 4) that is a function only of electrofiltration potentials in the bore hole.

Instead of obtaining indications simultaneously of alternating electrofiltration potentials and the direct current resistivity of the earth formations, indications might be obtained simultaneously of alternating electrofiltration potentials and of any other subject of interest in the bore hole, such as, for example, the electrical impedance of the formations or of the temperature existing at different depths in the bore hole. In such cases, it is only necessary that the electrical signal which is a function of the different subject of interest in the bore hole be either a direct current signal or an alternating current signal of different frequency from the frequency of the alternating electrofiltration potentials.

It is to be understood that the several different circuits employed in the embodiment described above for obtaining indications of electrofiltration potentials may be used indifferently with either embodiment.

The invention thus provides a new and improved method and apparatus for obtaining indications of electrofiltration potentials apart from other continuous potentials that may be present in a bore hole. By producing localized and periodically variable pressure variations at different depths in the bore hole, continuous electrofiltration potentials may be changed to alternating potentials that can be readily separated from other continuous potentials which may be encountered. Accordingly, the invention enables accurate indications of electrofiltration potentials to be obtained without taking any special precautions, even in wells located in the vicinity of strong telluric currents.

The several embodiments described above are intended to be illustrative and not restrictive. Numerous modifications in form and detail may be made in those embodiments within the scope of the following claims.

I claim:

1. A method of simultaneously investigating permeable earth formations and an electrical characteristic of earth formations traversed by a bore hole containing a column of liquid, comprising lowering a body through the bore hole and producing artificially at said body in the said liquid at the level of a relatively permeable formation, periodically fluctuating pressure at a relatively rapid rate above that to which a direct current meter is appreciably responsive, thereby creating periodically variable flow of the liquid into the permeable formation to generate variable alternating electrofiltration potentials in the vicinity of such permeable formation, simultaneously lowering an electrode with said body and in such relation thereto as to be substantially at the same level as the body, placing a second electrode at a position where it is not subject to the same instantaneous, fluctuating, liquid pressure as said first electrode, producing an electrical value of separably different character from said alternating electrofiltration potentials, which value is a function of an electrical characteristic of the surrounding formations, superimposing said electrical value and alternating potentials picked up by said electrodes and produced by said generated alternating electrofiltration potentials, and